Patented Aug. 9, 1949

2,478,862

UNITED STATES PATENT OFFICE 2,478,862

COLOR STABILIZATION OF VINYL HALIDE RESINS

Fred W. Cox, Cuyahoga Falls, and James M. Wallace, Jr., Akron, Ohio, assignors to Wingfoot Corporation, Akron, Ohio, a corporation of Delaware No Drawing. Application June 27, 1945, Serial No. 601,936

5 Claims. (Cl. 260—45.7)

This invention relates to the stabilization of copolymers of vinyl halide and particularly the vinyl halide resins which are copolymers of at least 70% of vinyl halide and at least 2% of another polymerizable mono-olefinic compound.

Vinyl halide copolymers generally will discolor when heated, or example at a temperature of 100° C. or higher, and especially in the presence of iron and iron salts. It has been discovered that the addition of a small proportion of an alkali metal monosulfide will enable the resin to resist the discoloration effect for substantial periods of time.

The vinyl halide copolymers which may be stabilized in accordance with this invention include copolymers of the vinyl halides of the group consisting of vinyl chloride, vinyl bromide, vinyl fluoride and vinyl iodide. The vinyl halide copolymers are copolymers of 70 to 98% of the vinyl halide and from 2 to 30% of another polymerizable mono-olefinic compound. Although any polymerizable mono-olefinic compound which is compatible with the vinyl halide in polymeric form, that is, which forms copolymers therewith, may be stabilized, the invention is particularly useful in the treatment of copolymers of monomeric mixtures of vinyl halide and from 2 to 30% of vinyl acetate, vinylidene chloride, styrene, the dialkyl esters of butenedioic acids i. e. the dialkyl fumarates, and the dialkyl maleates, the alkyl chloro maleates, the alkyl chloro fumarates, the alkyl acrylates, or the alpha substituted alkyl acrylates. The copolymers which are of particular importance are those of 80 to 95% of the vinyl halide and from 5 to 20% of the other monomer.

The stabilization against discoloration upon heating is effected by the addition of an alkali metal monosulfide. Although any member of this class of compounds is useful, for reasons of economy the sodium and potassium monosulfides are preferred. The quantity of stabilizer used will depend upon the severity of the heating to which the vinyl copolymer is to be subjected. Even traces of the agent will produce a beneficial result where only mild heating is to be encountered. Although from 0.05 to 10% by weight, based on the copolymer content of the resin will produce useful compositions, generally it is desirable to use from 0.5 to 5% of the alkali metal monosulfide.

The stabilizing agent may be incorporated by any of several methods. It may be added to the solid copolymer and mixed therein by means of a roll mill or other mixing machine adapted to blend solid plastic materials. The mixing machine may be heated during the mixing operation to render the copolymers more plastic. Alternatively, the stabilizing agent may be dissolved in any suitable solvent and the solution then mixed with the copolymer. The vinyl halide copolymer may be dissolved in a solvent, such as ethylene dichloride, and the stabilizing agent added to the solution and dispersed therein by means of any stirring device. If the copolymers are prepared by polymerization in an aqueous emulsion, the stabilizing agent may be added and distributed through the copolymer prior to coagulation. Any other method which permits a uniform distribution of the alkali metal monosulfides throughout the copolymer may be used.

The stabilized copolymers may be used in the preparation of cast films or in the fabrication of molded or extruded shapes, which uses are well known to the art. The stabilized vinyl halide copolymers are particularly useful in the preparation of transparent or light colored articles in which discoloration upon heating is undesirable.

Further details of the invention are set forth with respect to the following specific example.

Example

Two 10-gram samples of a copolymer of 90% vinyl chloride and 10% diethyl fumarate were milled with 2 ml. of dibutyl sebacate. One of these samples was milled with 0.2 gram of sodium monosulfide. The second sample was used as a control for the purposes of comparison. The copolymer samples were milled separately on a laboratory-size chromium-plated roll mill for 5 minutes at 140° F. and then for 5 minutes at 212° F. The copolymers were finally rolled into sheets 1 mm. in thickness. Specimens were cut from each of the two copolymer sheets and were tested by heating at 135° C. for periods of time varying up to four hours. It was found that the copolymer containing the sodium monosulfide was unaffected by the heat while the control copolymer was badly discolored.

This application is a continuation in part of application Serial No. 502,308, filed September 14, 1943, now abandoned.

Although the invention has been described with respect to a specific example, it is not intended that the details thereof shall be construed as limitations upon the scope of the invention except to the extent incorporated in the following claims.

We claim:

1. A vinyl halide resin resistant to discoloration upon heating comprising a copolymer resulting from the polymerization of a mixture comprising from 70 to 98% by weight of a vinyl halide and from 2 to 30% by weight of dialkyl fumarate, the copolymer containing intimately dispersed therein from 0.05 to 10% by weight based on the copolymer content of the resin of an alkali metal monosulfide.

2. A vinyl halide resin resistant to discoloration upon heating comprising a copolymer resulting from the polymerization of a mixture comprising from 70 to 98% by weight of a vinyl halide and from 2 to 30% by weight of diethyl fumarate, the copolymer containing intimately dispersed therein from 0.05 to 10% by weight based on the copolymer content of the resin of an alkali metal monosulfide.

3. A vinyl halide resin resistant to discoloration upon heating comprising a copolymer resulting from the polymerization of a mixture comprising from 70 to 98% by weight of a vinyl halide and from 2 to 30% by weight of a dialkyl ester of butenedioic acid, the copolymer containing intimately dispersed therein from 0.05 to 10% by weight based on the copolymer content of the resin of an alkali metal monosulfide.

4. A vinyl halide resin resistant to discoloration upon heating comprising a copolymer resulting from the polymerization of a mixture comprising from 70 to 98% by weight of a vinyl halide and from 2 to 30% by weight of a dialkyl fumarate, the copolymer containing intimately dispersed therein from 0.05 to 10% by weight based on the copolymer content of the resin of sodium monosulfide.

5. A vinyl halide resin resistant to discoloration upon heating comprising a copolymer resulting from the polymerization of a mixture comprising from 70 to 98% by weight of a vinyl halide and from 2 to 30% by weight of diethyl fumarate, the copolymer containing intimately dispersed therein from 0.05 to 10% by weight based on the copolymer content of the resin of sodium monosulfide.

FRED W. COX.
JAMES M. WALLACE, Jr.

REFERENCES CITED

The following references are of record in the file of this patent:

UNITED STATES PATENTS

| Number | Name | Date |
|---|---|---|
| 2,070,443 | McGahey | Feb. 9, 1937 |
| 2,215,196 | Schlack | Sept. 17, 1940 |
| 2,278,368 | Frost | Mar. 31, 1942 |

OTHER REFERENCES

Pavlovich et al., article abstracted in Chem. Abstracts, 32, 4380 (1938).